United States Patent
Wang et al.

(10) Patent No.: US 11,023,372 B2
(45) Date of Patent: Jun. 1, 2021

(54) APPLICATION MEMORY RECLAIM METHOD AND APPARATUS

(71) Applicant: HUAWEI TECHNOLOGIES CO., LTD., Guangdong (CN)

(72) Inventors: Bintian Wang, Beijing (CN); Xishi Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 16/023,126

(22) Filed: Jun. 29, 2018

(65) Prior Publication Data

US 2018/0307600 A1    Oct. 25, 2018

Related U.S. Application Data

(63) Continuation of application No. PCT/CN2016/111557, filed on Dec. 22, 2016.

(30) Foreign Application Priority Data

Dec. 31, 2015   (CN) .......................... 201511032537.7

(51) Int. Cl.
*G06F 12/02* (2006.01)
*G06F 11/34* (2006.01)

(52) U.S. Cl.
CPC .......... *G06F 12/0253* (2013.01); *G06F 11/34* (2013.01); *G06F 12/02* (2013.01);
(Continued)

(58) Field of Classification Search
CPC ................. G06F 12/0253; G06F 12/02; G06F 2212/1044; G06F 2212/7205
(Continued)

(56) References Cited

U.S. PATENT DOCUMENTS

| 2006/0074872 A1 | 4/2006 | Gordon |
| 2010/0229156 A1* | 9/2010 | Fink ..................... G06F 12/0253 717/127 |

(Continued)

FOREIGN PATENT DOCUMENTS

| CN | 1770125 A | 5/2006 |
| CN | 101833512 A | 9/2010 |

(Continued)

OTHER PUBLICATIONS

Minho et al: "Efficient memory reclaiming for mitigating sluggish response in mobile devices",2015 IEEE 5th International Conference On Consumer Electronics—Berlin (ICCE—Berlin), IEEE, Sep. 6, 2015, pp. 232-236, XP032855059 (Year: 2015).*

(Continued)

*Primary Examiner* — Than Nguyen
(74) *Attorney, Agent, or Firm* — Fish & Richardson P.C.

(57) ABSTRACT

This application relates to example memory reclaim methods and apparatuses, so as to resolve a problem of application stalling easily caused by memory reclaim that is not performed in time. One example method includes monitoring user operation and use information and memory occupation information of applications installed on a terminal. If it is determined, according to at least one of the user operation and use information or the memory occupation information, that a memory reclaim condition is currently met, an application whose memory is to be reclaimed is determined according to the user operation and use information and memory occupation information of applications currently running on the terminal and from the applications currently running. A memory reclaim is performed by invoking a memory reclaim interface provided by a kernel mode.

20 Claims, 6 Drawing Sheets

(52) U.S. Cl.
CPC ........... *G06F 2212/1024* (2013.01); *G06F 2212/1044* (2013.01); *G06F 2212/7205* (2013.01)

(58) Field of Classification Search
USPC ........................................................ 711/170
See application file for complete search history.

(56) References Cited

U.S. PATENT DOCUMENTS

| | | | |
|---|---|---|---|
| 2012/0137101 A1 | 5/2012 | Arcese et al. | |
| 2015/0095603 A1 | 4/2015 | Kim et al. | |
| 2015/0333971 A1 | 11/2015 | Wang et al. | |
| 2015/0347262 A1 | 12/2015 | Vyas et al. | |
| 2016/0070593 A1* | 3/2016 | Harris | G06F 12/0253 718/106 |
| 2017/0060448 A1* | 3/2017 | Schnarch | G06F 3/0652 |

FOREIGN PATENT DOCUMENTS

| | | |
|---|---|---|
| CN | 102799471 A | 11/2012 |
| CN | 103246568 A | 8/2013 |
| CN | 103324500 A | 9/2013 |
| CN | 103544063 A | 1/2014 |
| CN | 104111873 A | 10/2014 |
| CN | 104298612 A | 1/2015 |
| CN | 105701025 A | 6/2016 |
| KR | 20150141124 A | 12/2015 |
| WO | 2011131046 A1 | 10/2011 |

OTHER PUBLICATIONS

Cheng-Zen et al: "Design of an Intelligent Memory Reclamation Service on Android",2013 Conference On Technologies and Applications of Artificial Intelligence, IEEE, Dec. 6, 2013, pp. 37-102, XP032584625 (Year: 2013).*

Ju Minho et al: "Efficient memory reclaiming for mitigating sluggish response in mobile devices",2015 IEEE 5th International Conference on Consumer Electronics—Berlin (ICCE—Berlin), IEEE, Sep. 6, 2015, pp. 232-236, XP032855059.

Yang Cheng-Zen et al: "Design of an Intelligent Memory Reclamation Service on Android",2013 Conference on Technologies and Applications of Artificial Intelligence, IEEE, Dec. 6, 2013, pp. 97-102, XP032584625.

Extended European Search Report issued in European Application No. 16881077.8 dated Nov. 26, 2018, 10 pages.

International Search Report and Written Opinion issued in International Application No. PCT/CN2016/111557 dated Mar. 1, 2017, 11 pages.

Chinese Office Action issued in Chinese Application No. 201511032537.7 dated Feb. 24, 2018, 10 pages.

Office Action issued in Korean Application No. 10-2018-7020861 dated Aug. 6, 2019, 10 pages (with English translation).

Chinese Office Action issued in Chinese Application No. 201511032537.7 dated Nov. 1, 2018, 22 pages.

* cited by examiner

APPLICATION MEMORY RECLAIM METHOD AND APPARATUS

CROSS-REFERENCE TO RELATED APPLICATIONS

This application is a continuation of International application Ser. No. PCT/CN2016/111557, filed on Dec. 22, 2016, which claims priority to Chinese Patent Application No. 201511032537.7, filed on Dec. 31, 2015. The disclosures of the aforementioned applications are hereby incorporated by reference in their entireties.

TECHNICAL FIELD

This application relates to the field of computer technologies, and in particular, to a memory reclaim method and apparatus.

BACKGROUND

In consideration of production costs, memory capacity of a terminal device is usually relatively small, and in most cases, is 1 to 2 G. At present, a kernel satisfies, as much as possible, a requirement of an application program for applying for memory. As a result, on a terminal product such as a mobile phone, an application (such as Camera) that consumes relatively large memory stalls, or even the application is repeatedly exited and restarted in a starting or running process usually because sufficient memory (for example, an application may apply for 300 MB to 500 MB memory instantaneously) fails to be applied for.

A memory reclaim policy of a Linux system is triggering memory reclaim when memory is insufficient. For example, when an application is started or switched to a foreground interface, an application process in user mode applies to a kernel mode for memory, and memory reclaim is triggered if memory that the application needs to occupy is larger than system free memory. Specifically, memory that is least frequently used recently is selected, by using the least recently used (Least Recently Used, LRU) algorithm, for reclaim. In addition, memory reclaim may also be performed by using in-memory compression, same page merging, memory defragment, and the like. An Android (Android) system triggers memory reclaim in kernel mode by setting a free memory level in kernel mode. For example, if memory is less than $n_1$ MB, an application process whose priority is the lowest is killed, and if the memory is still less than $n_2$ ($n_1<n_2$) MB, an application process whose priority is one level higher is released.

According to both the foregoing memory reclaim policies, memory reclaim is triggered only when it is found, in kernel mode, that free memory that can be used is relatively small. Therefore, the following is likely to be caused: Memory whose utilization rate is relatively low in a system cannot be released in time. When memory reclaim is triggered after it is found that the free memory is insufficient, the following is likely to be caused: A currently running application that fails to apply for required memory in time stalls.

SUMMARY

This application provides a memory reclaim method and apparatus, to resolve, to some extent, a problem of application stalling easily caused by memory reclaim that is not performed in time.

This application provides a memory reclaim method, where the following is performed in user mode: monitoring user operation and use information and memory occupation information of applications installed on a terminal; and if it is determined, according to at least one of the user operation and use information or the memory occupation information of the applications installed on the terminal, that a memory reclaim condition is currently met, determining, according to user operation and use information and memory occupation information of applications currently running on the terminal and from the applications currently running on the terminal, an application whose memory is to be reclaimed, and performing memory reclaim by invoking a memory reclaim interface provided by a kernel mode.

In this application, memory reclaim is proactively performed by monitoring, in user mode, a user operation and use status and a memory occupation status of the applications installed on the terminal, so that when an application is frequently operated and used by a user and occupies relatively large memory, memory reclaim frequency may be increased, to ensure normal use of memory.

In an implementation, that it is determined, according to the user operation and use information and the memory occupation information of the applications installed on the terminal, that a memory reclaim condition is currently met includes: determining a memory reclaim time interval according to the user operation and use information and the memory occupation information of the applications installed on the terminal; and determining that the memory reclaim condition is currently met when current time reaches memory reclaim time indicated by the memory reclaim time interval.

In this implementation, first the memory reclaim time interval is determined according to a regularity of application use by the user, and then memory reclaim is proactively performed according to the memory reclaim time indicated by the memory reclaim time interval. In this manner, planned reclaim is performed on memory, so that available free memory in the terminal may be maintained at a relatively desirable level.

In the foregoing implementation, an optional manner of determining a memory reclaim time interval is: separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

Frequency of operating and using an application by the user is different in a different time segment. Therefore, in this manner, different memory reclaim time intervals may be used in different time segments. This further improves memory reclaim timeliness, and also avoids system resource waste caused by frequent execution of an unnecessary memory reclaim procedure.

In another implementation, that it is determined, according to the memory occupation information of the applications installed on the terminal, that a memory reclaim condition is currently met includes: if it is determined that system free memory is less than a first specified threshold, determining that the memory reclaim condition is currently met.

In this manner, memory insufficiency can be avoided to some extent.

In still another implementation, that it is determined, according to the user operation and use information and the memory occupation information of the applications installed on the terminal, that a memory reclaim condition is currently met includes: if it is detected that an application is started or switched to a foreground interface, determining, according to memory occupation information of the application and a size of system free memory, whether memory reclaim needs to be performed; and if memory reclaim needs to be performed, determining that the memory reclaim condition is currently met.

A newly started application or an application switched to the foreground interface is usually an application that the user is about to use, and in this manner, normal running of the newly started application or the application switched to the foreground interface may be ensured, thereby enhancing system performance, and improving user experience.

In yet another implementation, that it is determined, according to the user operation and use information of the applications installed on the terminal, that a memory reclaim condition is currently met includes: if a quantity of applications currently running in a background is greater than a specified quantity of applications allowed to run in the background, determining that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

In the foregoing implementation, an optional manner of determining an application whose memory is to be reclaimed, and performing memory reclaim by invoking a memory reclaim interface provided by a kernel mode is: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met.

In this manner, memory of an application (this application is usually an application not frequently used by the user) whose priority is relatively low is preferentially selected for reclaim, where the current time is not within a high-probability running time segment of the application, thereby enhancing system performance, and improving user experience.

In the foregoing implementation, the memory reclaim termination condition may include one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Further, the priority sequence of applications whose memory is to be reclaimed may be set according to the following steps:

grouping the applications installed on the terminal according to use frequency of the applications, where applications in a same group have a same use frequency range; and determining a memory reclaim priority sequence of applications in each group according to a use frequency range corresponding to each group, where applications in a same group have a same priority sequence.

In still yet another implementation, if it is determined, according to the user operation and use information of the applications installed on the terminal, that the memory reclaim condition is currently met, the performing memory reclaim by invoking a memory reclaim interface provided by a kernel mode includes: if it is detected that duration of stay, by an application on the terminal, in the background exceeds specified duration, determining that the memory reclaim condition is currently met, and reclaiming, by invoking the memory reclaim interface provided by the kernel mode, memory of the application whose duration of stay in the background exceeds the specified duration.

Herein, the application whose duration of stay in the background is relatively long is usually an application that is not operated by the user for a current period of time, and memory of the application may be released and therefore provided to an application that is in greater need of the memory, thereby improving an effective utilization rate of the memory.

This application further provides a memory reclaim apparatus, including:

a determining module, configured to monitor, in user mode, user operation and use information and memory occupation information of applications installed on a terminal; and a memory reclaim module, configured to: if it is determined, according to at least one of the user operation and use information or the memory occupation information of the applications installed on the terminal, that a memory reclaim condition is currently met, determine, according to user operation and use information and memory occupation information of applications currently running on the terminal and from the applications currently running on the terminal, an application whose memory is to be reclaimed, and perform memory reclaim by invoking a memory reclaim interface provided by a kernel mode.

In this application, memory reclaim is proactively performed by monitoring, in user mode, a user operation and use status and a memory occupation status of the applications installed on the terminal, so that when an application is frequently operated and used by a user and occupies relatively large memory, memory reclaim frequency may be increased, to ensure normal use of memory.

In an implementation, the memory reclaim module is specifically configured to:

determine a memory reclaim time interval according to the user operation and use information and the memory occupation information of the applications installed on the terminal; and determine that the memory reclaim condition is currently met when current time reaches memory reclaim time indicated by the memory reclaim time interval.

In this implementation, first the memory reclaim time interval is determined according to a regularity of application use by the user, and then memory reclaim is proactively performed according to the memory reclaim time indicated by the memory reclaim time interval. In this manner, planned reclaim is performed on memory, so that available free memory in the terminal may be maintained at a relatively desirable level.

In the foregoing implementation, an optional manner of determining the memory reclaim time interval by the memory reclaim module is: separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

Frequency of operating and using an application by the user is different in a different time segment. Therefore, in this manner, different memory reclaim time intervals may be used in different time segments. This further improves memory reclaim timeliness, and also avoids system resource waste caused by frequent execution of an unnecessary memory reclaim procedure.

In another implementation, the memory reclaim module is specifically configured to if it is determined that system free memory is less than a first specified threshold, determine that the memory reclaim condition is currently met.

In this manner, memory insufficiency can be avoided.

In still another implementation, the memory reclaim module is specifically configured to: if it is detected that an application is started or switched to a foreground interface, determine, according to memory occupation information of the application and a size of system free memory, whether memory reclaim needs to be performed; and if memory reclaim needs to be performed, determine that the memory reclaim condition is currently met.

A newly started application or an application switched to the foreground interface is usually an application that the user is about to use, and in this manner, normal running of the newly started application or the application switched to the foreground interface may be ensured, thereby enhancing system performance, and also improving user experience.

In yet another implementation, the memory reclaim module is specifically configured to if a quantity of applications currently running in a background is greater than a specified quantity of applications allowed to run in the background, determine that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

In the foregoing implementation, an optional manner of determining, by the memory reclaim module, the application whose memory is to be reclaimed, and performing memory reclaim by invoking the memory reclaim interface provided by a kernel mode is: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met.

In this manner, memory of an application (this application is usually an application not frequently used by the user) whose priority is relatively low is preferentially selected for reclaim, where the current time is not within a high-probability running time segment of the application, thereby enhancing system performance, and improving user experience.

In the foregoing implementation, the memory reclaim termination condition may include one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Further, the memory reclaim module may be specifically configured to set the priority sequence of applications whose memory is to be reclaimed according to the following steps: grouping the applications installed on the terminal according to use frequency of the applications, where applications in a same group have a same use frequency range; and determining a memory reclaim priority sequence of applications in each group according to a use frequency range corresponding to each group, where applications in a same group have a same priority sequence.

In still yet another implementation, the memory reclaim module is specifically configured to: if it is detected that duration of stay, by an application on the terminal, in the background exceeds specified duration, determine that the memory reclaim condition is currently met, and reclaim, by invoking the memory reclaim interface provided by the kernel mode, memory of the application whose duration of stay in the background exceeds the specified duration.

This application provides user equipment, where the user equipment includes a processor, a memory, and a bus. The memory is configured to store an execution instruction, and includes an internal memory device and an external memory. The internal memory device herein is also referred to as an internal memory, and is configured to temporarily store operational data of the processor, and data exchanged with the external memory such as a hard disk. The processor exchanges data with the external memory by using the internal memory device, and when the user equipment runs, the processor and the memory communicate with each other by using the bus, so that the processor executes the following instructions in user mode:

monitoring user operation and use information and memory occupation information of applications installed on a terminal; and when it is determined, according to at least one of the user operation and use information or the memory occupation information of the applications installed on the terminal, that a memory reclaim condition is currently met, determining, according to user operation and use information and memory occupation information of applications currently running on the terminal and from the applications currently running on the terminal, an application whose memory is to be reclaimed, and performing memory reclaim by invoking a memory reclaim interface provided by a kernel mode.

In this application, memory reclaim is proactively performed by monitoring, in user mode, a user operation and use status and a memory occupation status of the applications installed on the terminal, so that when an application is frequently operated and used by a user and occupies relatively large memory, memory reclaim frequency may be increased, to ensure normal use of memory.

In an implementation, in the instructions executed by the processor, that it is determined, according to the user operation and use information and the memory occupation information of the applications installed on the terminal, that a memory reclaim condition is currently met includes: determining a memory reclaim time interval according to the user operation and use information and the memory occupation information of the applications installed on the terminal; and determining that the memory reclaim condition is currently met when current time reaches memory reclaim time indicated by the memory reclaim time interval.

In this implementation, first the memory reclaim time interval is determined according to a regularity of application use by the user, and then memory reclaim is proactively performed according to the memory reclaim time indicated by the memory reclaim time interval. In this manner, planned reclaim is performed on memory, so that available free memory in the terminal may be maintained at a relatively desirable level.

In the foregoing implementation, in the instructions executed by the processor, an optional manner of determining the memory reclaim time interval by the processor is:

separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

Frequency of operating and using an application by the user is different in a different time segment. Therefore, in this manner, different memory reclaim time intervals may be used in different time segments. This further improves memory reclaim timeliness, and also avoids system resource waste caused by frequent execution of an unnecessary memory reclaim procedure.

In another implementation, in the instructions executed by the processor, that it is determined, according to the memory occupation information of the applications installed on the terminal, that a memory reclaim condition is currently met includes: if it is determined that system free memory is less than a first specified threshold, determining that the memory reclaim condition is currently met.

In this manner, memory insufficiency can be avoided.

In still another implementation, in the instructions executed by the processor, that it is determined, according to the user operation and use information and the memory occupation information of the applications installed on the terminal, that a memory reclaim condition is currently met includes: if it is detected that an application is started or switched to a foreground interface, determining, according to memory occupation information of the application and a size of system free memory, whether memory reclaim needs to be performed; and if memory reclaim needs to be performed, determining that the memory reclaim condition is currently met.

A newly started application or an application switched to the foreground interface is usually an application that the user is about to use, and in this manner, normal running of the newly started application or the application switched to the foreground interface may be ensured, thereby enhancing system performance, and also improving user experience.

In yet another implementation, in the instructions executed by the processor, that it is determined, according to the user operation and use information of the applications installed on the terminal, that a memory reclaim condition is currently met includes: if a quantity of applications currently running in a background is greater than a specified quantity of applications allowed to run in the background, determining that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

In the foregoing implementation, in the instructions executed by the processor, an optional manner of determining an application whose memory is to be reclaimed, and performing memory reclaim by invoking a memory reclaim interface provided by a kernel mode is: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met.

In this manner, memory of an application (this application is usually an application not frequently used by the user) whose priority is relatively low is preferentially selected for reclaim, where the current time is not within a high-probability running time segment of the application, thereby enhancing system performance, and improving user experience.

In the foregoing implementation, the memory reclaim termination condition may include one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Further, in the instructions executed by the processor, an optional manner of setting the priority sequence of applications whose memory is to be reclaimed is:

grouping the applications installed on the terminal according to use frequency of the applications, where applications in a same group have a same use frequency range; and determining a memory reclaim priority sequence of applications in each group according to a use frequency range corresponding to each group, where applications in a same group have a same priority sequence.

In still yet another implementation, in the instructions executed by the processor, if it is determined, according to the user operation and use information of the applications installed on the terminal, that the memory reclaim condition is currently met, the performing memory reclaim by invoking a memory reclaim interface provided by a kernel mode includes: if it is detected that duration of stay, by an application on the terminal, in the background exceeds specified duration, determining that the memory reclaim condition is currently met, and reclaiming, by invoking the memory reclaim interface provided by the kernel mode, memory of the application whose duration of stay in the background exceeds the specified duration.

Herein, the application whose duration of stay in the background is relatively long is usually an application that is not operated by the user for a current period of time, and memory of the application may be released and therefore provided to an application that is in greater need of the memory, thereby improving an effective utilization rate of the memory.

DESCRIPTION OF EMBODIMENTS

Figure 1:
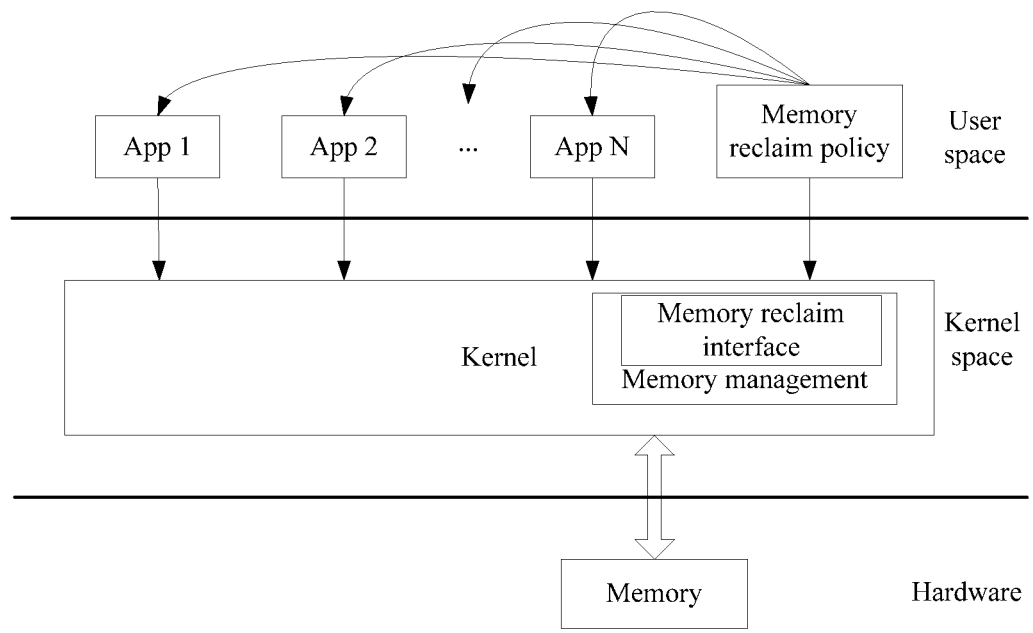
FIG. 1 is a schematic diagram of memory reclaim according to this application.

As shown in FIG. 1, FIG. 1 is a schematic diagram of memory reclaim according to this application. In this application, memory reclaim is performed by running a memory reclaim policy in user mode and by using a memory reclaim interface provided by a kernel mode. Specifically, memory reclaim is triggered by monitoring user operation and use information and memory occupation information of applications (Application, App) installed on a terminal. After a memory reclaim condition is met, an application whose memory is to be reclaimed is selected according to user operation and use information and memory occupation information of applications currently running on the terminal and from the applications currently running on the terminal, and memory reclaim is performed by invoking the memory reclaim interface provided by the kernel mode to the user mode. In this application, memory reclaim is proactively performed by monitoring, in user mode, the user operation and use information and the memory occupation information of the applications, so that when an application is frequently operated and used by a user and occupies relatively large memory, memory reclaim frequency may be increased, to ensure timeliness of memory reclaim.

The following further describes the embodiments of this application in detail with reference to the accompanying drawings of this specification.

Embodiment 1

Figure 2:
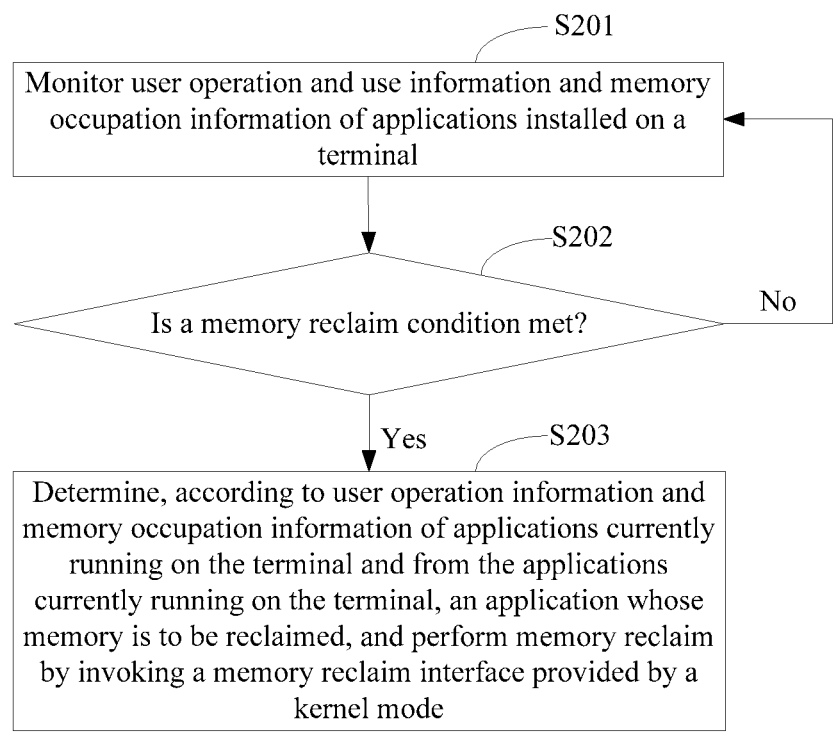
FIG. 2 is a flowchart of a memory reclaim method according to Embodiment 1 of this application.

As shown in FIG. 2, FIG. 2 is a flowchart of a memory reclaim method according to Embodiment 1 of this application, and the method performs the following steps in user mode.

S201. Monitor user operation and use information and memory occupation information of applications installed on a terminal.

Herein, the memory occupation information may include a size of memory occupied when an application runs, and the user operation and use information of the applications may include use frequency, a use time segment, use duration and the like of an application by a user.

In specific implementation, a running status of each application in a terminal system and a size of memory occupied when the application runs may be monitored in real time by using a monitoring process in user mode. Use frequency, a use time segment, use duration and the like of an application by a user may be determined by using the running status of the application obtained by monitoring. Herein, the use time segment of using the application by the user may be a time segment, in which the user uses the application, in a plurality of preset time segments, or may be an actual time segment from a moment when the user starts to operate the application to a moment when the user finishes operating the application.

Herein, monitoring the running status of each application on the terminal system may include: monitoring an application starting status, an application closing status, a status of switching of an application from a background to a foreground interface, a status of switching from a foreground interface to a background, and the like. The monitoring process may specifically obtain, by means of query, the foregoing running status of the application by using a query interface provided by a proc file system.

In specific implementation, for different applications, manners of collecting statistics about user operation and use information of the applications may be different. For example, for an application that needs to be operated in a foreground interface by a user, such as WeChat or Calendar, a time at which the application is started or switched to the foreground interface may be used as a time at which the user starts to operate the application, and a time at which the application is closed or switched to a background for running may be used as a time at which the user finishes operating the application. For an application that does not need to be always operated by a user in a foreground interface, such as downloading software, a time at which the application is started may be used as a time at which the user starts to operate the application, and a time at which the application is closed may be used as a time at which the user finishes operating the application. Use frequency, a use time segment, use duration, and the like of using the application by the user may be determined according to the time at which the user starts to operate the application and the time at which the user finishes operating the application that are obtained by means of statistics collection.

S202. Determine, according to at least one of the user operation and use information or the memory occupation information of the applications installed on the terminal, whether a memory reclaim condition is currently met; and go to S203 if the memory reclaim condition is currently met, or return to S201 if the memory reclaim condition is not currently met.

In specific implementation, a condition that triggers memory reclaim in user mode may be set according to an actual requirement. For example, a memory reclaim time interval may be determined according to the user operation and use information and the memory occupation information of the applications installed on the terminal, and memory reclaim is triggered according to a preset memory reclaim time interval, to implement planned memory reclaim, so that available free memory in the terminal is maintained at a relatively desirable level. Herein, there may be one or more preset memory reclaim time intervals. For example, if both use frequency of using an application by a user in a whole day and memory occupation are relatively stable, only one memory reclaim time interval may be set. Alternatively, if the user concentrates in using an application in only one time segment in a whole day, and frequency of using the application is relatively stable, a memory reclaim time interval may be set only in this time segment, and memory reclaim is not performed in another time segment. If frequency of using the application by the user varies greatly in different time segments in a day, different memory reclaim time intervals may be used in different time segments in a day. In addition, it may be set that: memory reclaim is triggered when system free memory is less than a threshold (memory reclaim is triggered according to the memory occupation information of the applications installed on the terminal); when it is detected that an application is started or switched to the foreground interface, memory reclaim is triggered according to memory occupation information of the application and a size of system free memory (memory reclaim is triggered according to the user operation and use information and the memory occupation information of the applications installed on the terminal); or memory reclaim is triggered when it is detected that duration of stay, by an application on the terminal, in the background exceeds specified duration (memory reclaim is triggered according to the user operation and use information of the applications).

S203. Determine, according to user operation and use information and memory occupation information of applications currently running on the terminal and from the applications currently running on the terminal, an application whose memory is to be reclaimed, and perform memory reclaim by invoking a memory reclaim interface provided by a kernel mode.

Herein, the applications installed on the terminal in S201 and S202 include the applications currently running on the terminal in S203. In addition to the applications currently running on the terminal in S203, the applications installed on the terminal further include an application that is currently in a closed state.

In specific implementation, a memory reclaim program in kernel mode is invoked in user mode by using the memory reclaim interface provided by the kernel mode, so as to perform the memory reclaim. The memory reclaim interface may be implemented based on a system such as a linux procfs file system or a linux sysfs file system.

In a linux system, existing memory reclaim management in kernel mode is implemented based on an LRU algorithm. In the existing memory reclaim management, memory occupied by an application is divided into two main types: an anonymous page (such as memory allocated by using a dynamic memory allocation (malloc) function) and a file page (such as memory allocated during reading and writing of a file). Memory that is not frequently used recently is put into a linked list according to the LRU algorithm, and the linked list is shrunk each time reclaim is performed, to reclaim a part of memory pages (which are mainly page caches (page cache)). An underlying function used for memory reclaim in kernel mode is try_to_free_pages( ). In this application, an interface of the function is exposed to a user mode for invoking. In user mode, memory reclaim is implemented by invoking the interface of the function and based on a memory reclaim policy provided in this application.

Embodiment 2

The following describes an implementation of this application: determining a memory reclaim time interval by collecting statistics about user operation and use information and memory occupation information of applications installed on a terminal, and performing memory reclaim based on the determined memory reclaim time interval.

Figure 3:
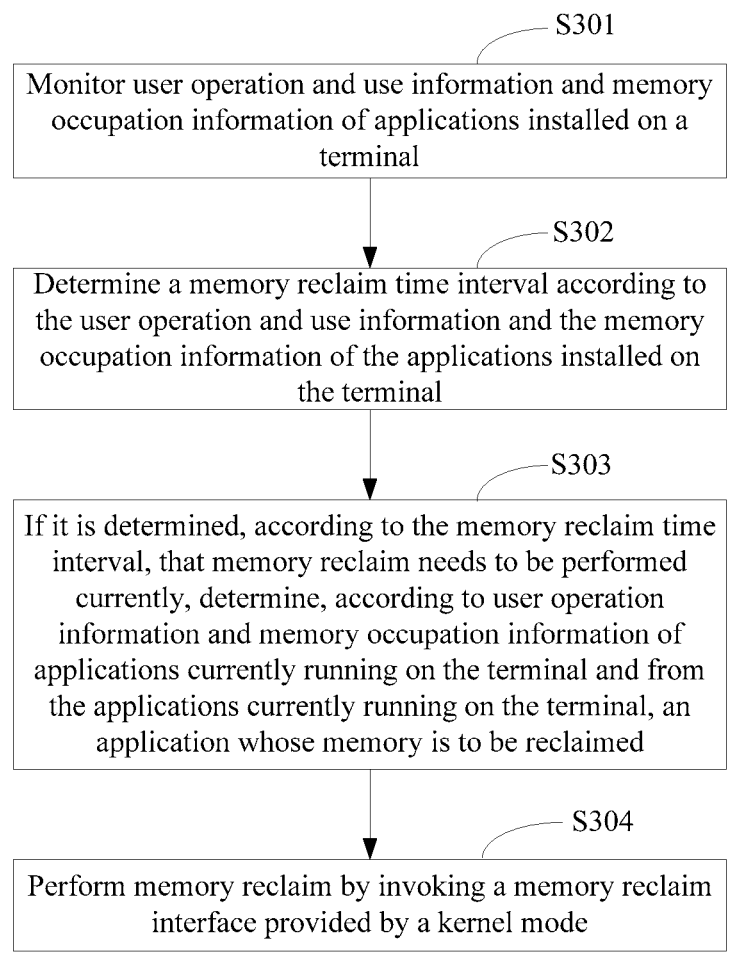
FIG. 3 is a flowchart of a memory reclaim method according to Embodiment 2 of this application.

As shown in FIG. 3, FIG. 3 is a flowchart of a memory reclaim method according to Embodiment 2 of this application, the method performs the following steps in user mode:

S301. Monitor user operation and use information and memory occupation information of applications installed on a terminal.

In specific implementation, statistics about user operation and use information of an application, such as use frequency and a use time segment of using an application by a user, and memory occupation information such as a size of memory occupied when an application runs are collected by monitoring a running status of each application in a terminal system in user mode in real time.

S302. Determine a memory reclaim time interval according to the user operation and use information and the memory occupation information of the applications installed on the terminal.

Herein, the memory reclaim time interval may be determined according to the user operation and use information and the memory occupation information of the applications obtained by means of statistics collection in S301. There may be one or more memory reclaim time intervals. For example, if both use frequency of using an application by a user in a whole day and memory occupation are relatively consistent, only one memory reclaim time interval may be set. If use frequency of using an application by a user is different in different time segments in a day, different memory reclaim time intervals may be used in different time segments in a day. For example, memory reclaim may be performed more frequently in a time segment within which an application is frequently used and relatively large memory is occupied. On the contrary, memory reclaim may be performed less frequently in a time segment within which an application is infrequently used and relatively small memory is occupied.

In specific implementation, a plurality of time segments may be preset according to experience. User operation and use information and memory occupation information, in each preset time segment, of the applications installed on the terminal are determined. A memory reclaim time interval in each preset time segment is determined according to the user operation and use information and the memory occupation information, in the preset time segment, of the applications installed on the terminal.

For example, a day is used as a granularity, and several time segments 9:00-17:00, 17:00-23:00, and 23:00-9:00 are preset. Statistics about user operation and use information and memory occupation information, in the several preset time segments, of applications are separately collected. For example, in the time segment 17:00-23:00, a user uses the applications most frequently, a size of memory occupied by the applications is also the largest, and a memory reclaim time interval in this time segment may be set to 0.5 hours. In the time segment 9:00-17:00, frequency of using the applications by the user is intermediate, a size of occupied memory is also intermediate, and a memory reclaim time interval in this time segment may be set to 1 hour. In the time segment 23:00-9:00, the user uses the applications least frequently, a size of occupied memory is also the smallest, and a memory reclaim time interval in this time segment may be set to 3 hours. For another example, a difference between application use statuses in a working day and a non-working day of a week may further be taken into consideration, to respectively set different memory reclaim time intervals for the working day and the non-working day. For example, frequency of using an application by a user on Saturday and Sunday is obviously higher than frequency of using the application in a working day. The foregoing memory reclaim time intervals may still be used from Monday to Friday, and memory reclaim frequency on Saturday and Sunday is increased. For example, the foregoing memory reclaim time intervals in the time segments 9:00-17:00, 17:00-23:00, and 23:00-9:00 are separately halved on Saturday and Sunday. That is, a memory reclaim time interval in the time segment 17:00-23:00 is set to 0.25 hours, a memory reclaim time interval in the time segment 9:00-17:00 is set to 0.5 hours, and a memory reclaim time interval in the time segment 23:00-9:00 is set to 1.5 hours.

S303. If it is determined, according to the memory reclaim time interval, that memory reclaim needs to be performed currently, determine, according to user operation and use information and memory occupation information of applications currently running on the terminal and from the applications currently running on the terminal, an application whose memory is to be reclaimed. Herein, in order to ensure that a user normally uses an application, memory reclaim is not considered for an application currently used by the user. The application currently used by the user may include a foreground application, and may further include an application that runs in a background, such as file downloading.

S304. Perform memory reclaim by invoking a memory reclaim interface provided by a kernel mode.

In specific implementation, when it is determined that memory reclaim time is reached according to the determined memory reclaim time interval, memory of an application that is currently running on the terminal and that is not operated or used by the user may be reclaimed if current time is not within a time range, obtained by means of statistics collection, in which there is a relatively high probability of using the application by the user. In this way, applications are successfully selected for memory reclaim until a memory reclaim termination condition is met.

In an implementation, after it is determined that memory reclaim needs to be performed currently, an application that is currently running on the terminal and that is not operated or used by the user may be selected according to a prestored priority sequence of applications whose memory is to be reclaimed. Whether current time is within a high-probability use time segment (that is, a time segment in which a user operation and use probability of an application is relatively high) of the selected application is determined. The high-probability use time segment of the application is determined based on user operation and use information of the application (for example, if a user uses an application from 12:00 to 13:00 in five consecutive days, 12:00 to 13:00 is a high-probability running time segment of the application). If the current time is not within the high-probability use time segment of the selected application, it is determined that the selected application is an application whose memory is to be reclaimed. The foregoing steps are repeated until a memory reclaim termination condition is met. Herein, the memory reclaim termination condition may include that a size of system free memory is larger than a second specified threshold.

The priority sequence may be a priority sequence between different application groups. Specifically, the applications installed on the terminal may be grouped according to use frequency of the applications, where applications in a same group have a same use frequency range. A memory reclaim priority sequence of applications in each group is determined according to a use frequency range corresponding to each group, where applications in a same group have a same priority sequence. For example, some applications, such as User Interface (User Interface, UI), may be related to a key element of an operating system in the terminal, this type of applications may be classified into a group (group) 1, indicating very important applications. For some applications frequently used by the user, such as WeChat and Camera, this type of applications may be classified into a group 2, indicating generally important applications. For some applications not frequently used, such as Calculator and Stock, this type of applications may be classified into a group 3, indicating unimportant applications. It is set as follows: a memory reclaim priority of the group 3> a memory reclaim priority of the group 2> a memory reclaim priority of the group 1. During the memory reclaim, reclaim of memory of the applications in the group 3 is considered most preferentially, reclaim of memory of the applications in the group 2 is considered second most preferentially, and memory of the applications in the group 1 is not reclaimed.

Embodiment 3

In order to further optimize a memory reclaim policy to ensure timely and proper memory reclaim, an embodiment of this application further provides an implementation for performing memory reclaim by using a plurality of memory reclaim conditions.

Figure 4:
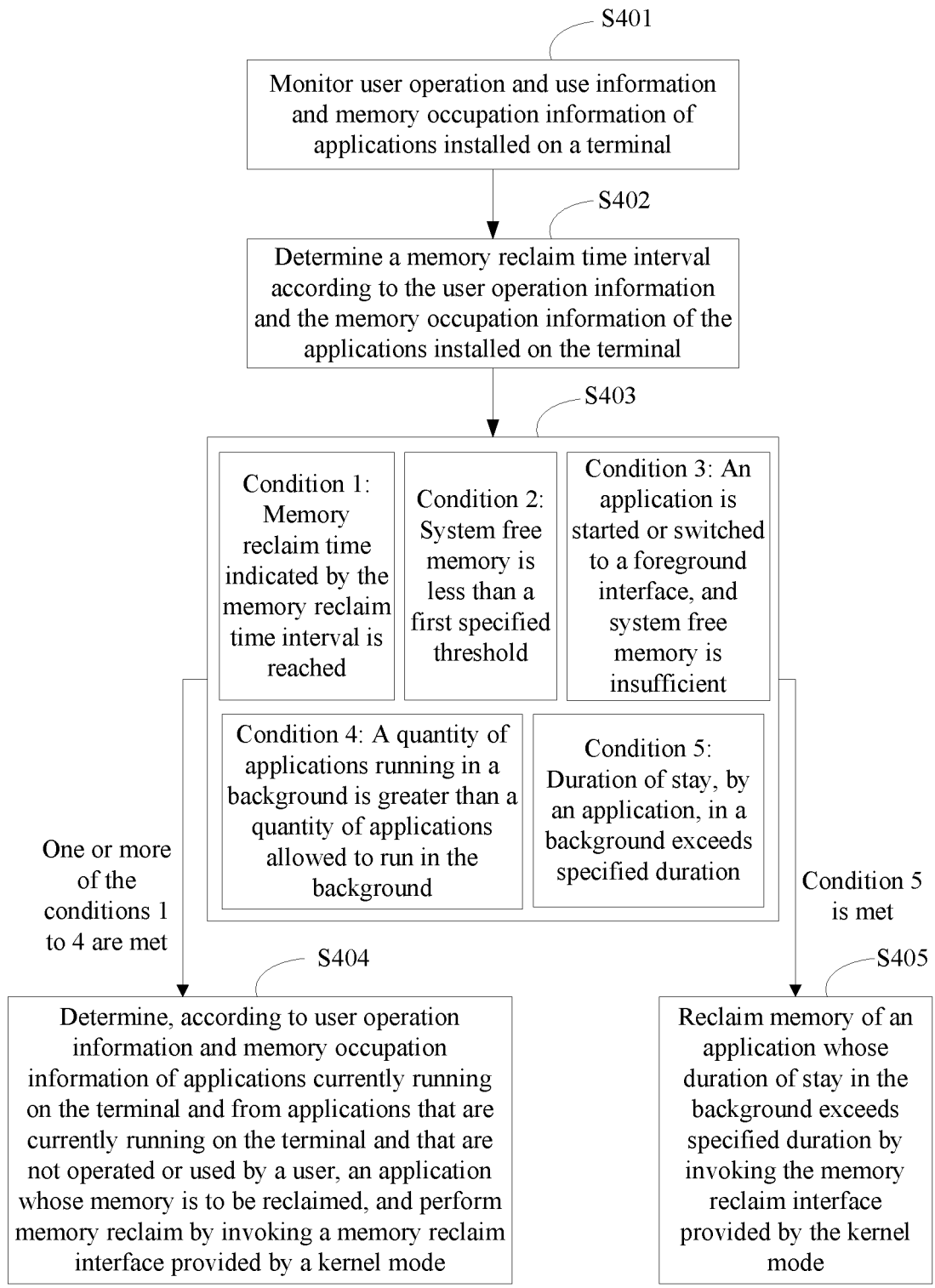
FIG. 4 is a flowchart of a memory reclaim method according to Embodiment 3 of this application.

As shown in FIG. 4, FIG. 4 is a flowchart of a memory reclaim method according to Embodiment 3 of this application, the method performs the following steps in user mode.

S401. Monitor user operation and use information and memory occupation information of applications installed on a terminal.

S402. Determine a memory reclaim time interval according to the user operation and use information and the memory occupation information of the applications installed on the terminal.

S403. Trigger a memory reclaim procedure in S404 when any one or more of the following conditions 1 to 4 are met, and trigger a memory reclaim procedure in S405 when a condition 5 is met.

1. It is determined, according to the memory reclaim time interval, that memory reclaim needs to be performed currently.

In specific implementation, whether memory reclaim needs to be performed currently may also be determined with reference to system free memory. That is, when memory reclaim time indicated by the memory reclaim time interval is currently reached, the memory reclaim can be performed if the system free memory is less than a threshold (the threshold may be a first specified threshold, a second specified threshold or another threshold that are described in the following, where the another threshold may be a threshold between the first specified threshold and the second specified threshold, and the first specified threshold is less than the second specified threshold).

2. It is detected that system free memory is less than a first specified threshold.

3. When it is detected that an application is started or switched to a foreground interface, it is determined, according to memory occupation information of the application and a size of system free memory, that memory reclaim needs to be performed currently.

Herein, when a size of memory required by the application newly started or switched to the foreground interface is larger than the system free memory, memory reclaim is triggered.

4. A quantity M of applications running in a background is greater than a current specified quantity N of applications allowed to run in the background.

In specific implementation, the quantity of applications allowed to run in the background may be set according to a size of current system free memory.

5. It is detected that duration of stay, by an application on the terminal, in the background exceeds specified duration.

It should be noted that for the foregoing conditions 2 to 5, a person skilled in the art may select only a part of the conditions according to an actual requirement.

S404. Determine, according to user operation and use information and memory occupation information of applications currently running on the terminal and from applications that are currently running on the terminal and that are not operated or used by the user, an application whose memory is to be reclaimed, and perform memory reclaim by invoking a memory reclaim interface provided by a kernel mode.

In specific implementation, after a terminal system is started, a daemon, used for memory reclaim, in user mode of this application is started first, then applications are started, and an application running data table is maintained, to record memory occupation statuses of the applications in the terminal, and collect statistics about a high-probability running time segment, as shown in the following Table 1.

TABLE 1

| Application | Occupied memory | High-probability running time segment |
| --- | --- | --- |
| App 1 | x1KB | T1-T2 |
| App 2 | x2KB | T3-T4 |
| App 3 | x3KB | T5-T6 |
| App 4 | x4KB | T7-T8 |
| ... | ... | ... |

If it is determined that memory reclaim needs to be performed, an application currently running on the terminal may be selected according to a prestored priority sequence of applications whose memory is to be reclaimed. Referring to Table 1, it is determined whether current time is within a high-probability use time segment of the selected application. If the current time is not within the high-probability use time segment of the selected application, the selected application is used as an application whose memory is to be reclaimed, memory reclaim is performed by invoking the memory reclaim interface that is used for memory reclaim and provided by the kernel mode, and the foregoing steps are repeated until a memory reclaim termination condition is met. Herein, based on differences between the conditions 1 to 4, the foregoing memory reclaim termination condition may include one or more of: the size of the system free memory is larger than a second specified threshold; memory required by a currently started application is less than the system free memory; memory required by an application switched to the foreground interface is less than the system free memory; or a quantity of applications running in the background is less than or equal to the specified quantity of applications allowed to run in the background. For example, for the conditions 1 and 2, the memory reclaim termination condition may be that the size of the system free memory is larger than a second specified threshold (the second specified threshold is larger than the first specified threshold); for the condition 3, the memory reclaim termination condition may be that memory required by a currently started application is less than the system free memory; and for the condition 4, the memory reclaim termination condition may be that a quantity of applications running in the background is equal to the specified quantity of applications allowed to run in the background, that is, in S303, M-N applications whose memory is to be reclaimed are selected from the applications running in the background.

S405. Reclaim, by invoking the memory reclaim interface provided by the kernel mode, memory of an application whose duration of stay in the background exceeds specified duration.

Based on a same inventive concept, this application further provides a memory reclaim apparatus and user equipment corresponding to the memory reclaim method. Because principles of the apparatus and user equipment for resolving problems are similar to those of the memory reclaim method in this application, for implementation of the apparatus and user equipment, reference may be made to implementation of the method. Repeated parts are not described again.

Embodiment 4

Figure 5:
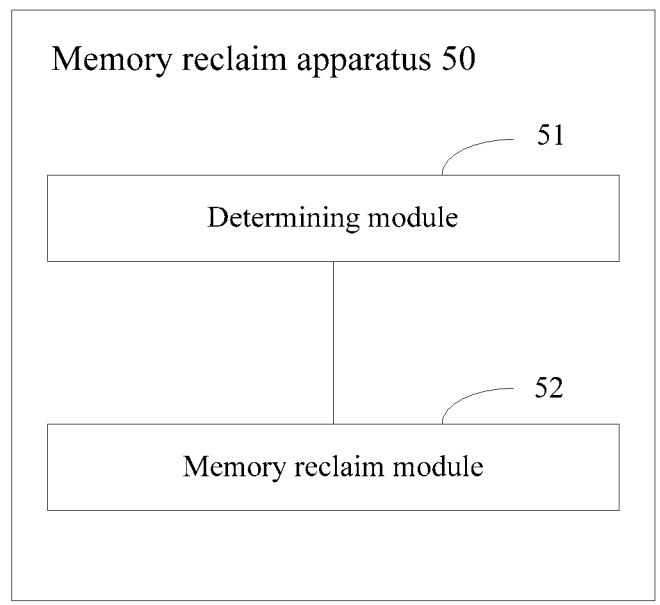
FIG. 5 is a schematic structural diagram of a memory reclaim apparatus 50 according to an embodiment of this application.

As shown in FIG. 5, FIG. 5 is a schematic structural diagram of a memory reclaim apparatus 50 according to an embodiment of this application, and the memory reclaim apparatus 50 includes:

a determining module 51, configured to monitor, in user mode, user operation and use information and memory occupation information of applications installed on a terminal; and a memory reclaim module 52, configured to: if it is determined, according to at least one of the user operation and use information or the memory occupation information of the applications installed on the terminal, that a memory reclaim condition is currently met, determine, according to user operation and use information and memory occupation information of applications currently running on the terminal and from the applications currently running on the terminal, an application whose memory is to be reclaimed, and perform memory reclaim by invoking a memory reclaim interface provided by a kernel mode.

In this application, memory reclaim is proactively performed by monitoring, in user mode, a user operation and use status and a memory occupation status of the applications installed on the terminal, so that when an application is frequently operated and used by a user and occupies relatively large memory, memory reclaim frequency may be increased, to ensure normal use of memory.

Optionally, the memory reclaim module 52 is specifically configured to:

determine a memory reclaim time interval according to the user operation and use information and the memory occupation information of the applications installed on the terminal; and determine that the memory reclaim condition is currently met when current time reaches memory reclaim time indicated by the memory reclaim time interval.

In this implementation, the memory reclaim module 52 first determines the memory reclaim time interval according to a regularity of application use by the user, and then actively performs the memory reclaim according to the memory reclaim time indicated by the memory reclaim time interval. In this manner, planned reclaim is performed on memory, so that available free memory in the terminal may be maintained at a relatively desirable level.

Optionally, the memory reclaim module 52 is specifically used to determine the memory reclaim time interval according to the following steps:

separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

Frequency of operating and using an application by the user is different in a different time segment. Therefore, in this manner, different memory reclaim time intervals may be used in different time segments. This further improves memory reclaim timeliness, and also avoids system resource waste caused by frequent execution of an unnecessary memory reclaim procedure.

Optionally, the memory reclaim module 52 is specifically configured to:

if it is determined that system free memory is less than a first specified threshold, determine that the memory reclaim condition is currently met.

In this manner, memory insufficiency can be avoided to some extent.

Optionally, the memory reclaim module 52 is specifically configured to:

if it is detected that an application is started or switched to a foreground interface, determine, according to memory occupation information of the application and a size of system free memory, whether memory reclaim needs to be performed; and if memory reclaim needs to be performed, determine that the memory reclaim condition is currently met.

A newly started application or an application switched to the foreground interface is usually an application that the user is about to use, and in this manner, normal running of the newly started application or the application switched to the foreground interface may be ensured, thereby enhancing system performance, and improving user experience.

Optionally, the memory reclaim module 52 is specifically configured to:

if a quantity of applications currently running in a background is greater than a specified quantity of applications allowed to run in the background, determine that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

Optionally, the memory reclaim module 52 is specifically configured to:

select, according to a prestored priority sequence of applications whose memory is to be reclaimed, an application that is currently running on the terminal and that is not operated or used by a user, and determine whether current time is within a high-probability use time segment of the selected application, where the high-probability use time segment of the application is determined based on user operation and use information of the application; if the current time is not within the high-probability use time segment of the selected application, determine that the selected application is an application whose memory is to be reclaimed, and perform memory reclaim by invoking the memory reclaim interface provided by the kernel mode; and repeat the foregoing steps until a memory reclaim termination condition is met.

In this manner, memory of an application (this application is usually an application not frequently used by the user) whose priority is relatively low is preferentially selected for reclaim, where the current time is not within a high-probability running time segment of the application, thereby enhancing system performance, and improving user experience.

Optionally, the memory reclaim termination condition includes one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Optionally, the memory reclaim module 52 is specifically configured to set the priority sequence of applications whose memory is to be reclaimed according to the following steps:

grouping the applications installed on the terminal according to use frequency of the applications, where applications in a same group have a same use frequency range; and determining a memory reclaim priority sequence of applications in each group according to a use frequency range corresponding to each group, where applications in a same group have a same priority sequence.

Optionally, the memory reclaim module 52 is specifically configured to:

if it is detected that duration of stay, by an application on the terminal, in the background exceeds specified duration, reclaim memory of the application whose duration of stay in the background exceeds the specified duration.

Herein, the application whose duration of stay in the background is relatively long is usually an application that is not operated by the user for a current period of time, and memory of the application may be released and therefore provided to an application that is in greater need of the memory, thereby improving an effective utilization rate of the memory.

Embodiment 5

Figure 6:
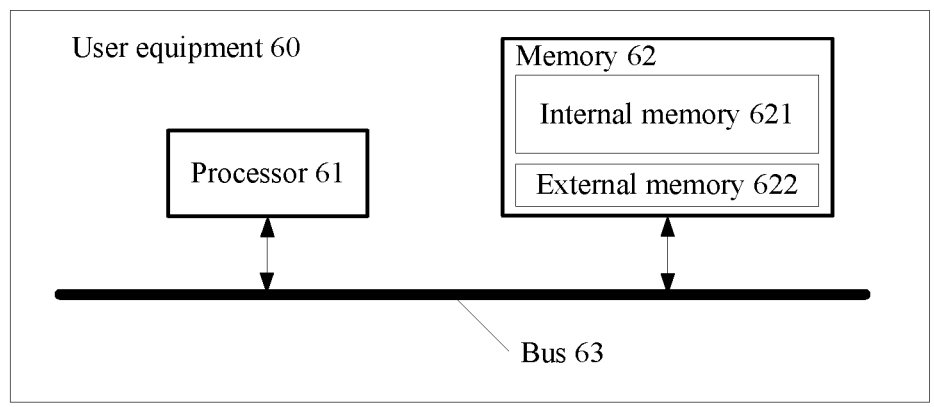
FIG. 6 is a schematic structural diagram of user equipment 60 according to an embodiment of this application.

As shown in FIG. 6, FIG. 6 is a schematic structural diagram of user equipment 60 according to an embodiment of this application, and the user equipment 60 includes a processor 61, a memory 62, and a bus 63. The memory 62 is configured to store an execution instruction, and includes an internal memory device 621 and an external memory 622. The internal memory device 621 herein is also referred to as an internal memory, and is configured to temporarily store operational data of the processor 61, and data exchanged with the external memory 622 such as a hard disk. The processor 61 exchanges data with the external memory 622 by using the internal memory device 621, and when the user equipment 60 runs, the processor 61 and the memory 62 communicate with each other by using the bus 63, so that the processor 61 executes the following instructions in user mode:

monitoring user operation and use information and memory occupation information of applications installed on a terminal; and when it is determined, according to at least one of the user operation and use information or the memory occupation information of the applications installed on the terminal, that a memory reclaim condition is currently met, determining, according to user operation and use information and memory occupation information of applications currently running on the terminal and from the applications currently running on the terminal, an application whose memory is to be reclaimed, and performing memory reclaim by invoking a memory reclaim interface provided by a kernel mode.

Optionally, in the instructions executed by the processor 61, that it is determined, according to the user operation and use information and the memory occupation information of the applications installed on the terminal, that a memory reclaim condition is currently met includes: determining a memory reclaim time interval according to the user operation and use information and the memory occupation information of the applications installed on the terminal; and determining that the memory reclaim condition is currently met when current time reaches memory reclaim time indicated by the memory reclaim time interval.

Optionally, in the instructions executed by the processor 61, the determining a memory reclaim time interval includes:

separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

Optionally, in the instructions executed by the processor 61, that it is determined, according to the memory occupation information of the applications installed on the terminal, that a memory reclaim condition is currently met includes: if it is determined that system free memory is less than a first specified threshold, determining that the memory reclaim condition is currently met.

Optionally, in the instructions executed by the processor 61, that it is determined, according to the user operation and use information and the memory occupation information of the applications installed on the terminal, that a memory reclaim condition is currently met includes: if it is detected that an application is started or switched to a foreground interface, determining, according to memory occupation information of the application and a size of system free memory, whether memory reclaim needs to be performed; and if memory reclaim needs to be performed, determining that the memory reclaim condition is currently met.

Optionally, in the instructions executed by the processor 61, that it is determined, according to the user operation and use information of the applications installed on the terminal, that a memory reclaim condition is currently met includes: if a quantity of applications currently running in a background is greater than a specified quantity of applications allowed to run in the background, determining that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

Optionally, in the instructions executed by the processor 61, the determining an application whose memory is to be reclaimed, and performing memory reclaim by invoking a memory reclaim interface provided by a kernel mode includes: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met.

Optionally, the memory reclaim termination condition includes one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Optionally, in the instructions executed by the processor 61, setting the priority sequence of applications whose memory is to be reclaimed includes:

grouping the applications installed on the terminal according to use frequency of the applications, where applications in a same group have a same use frequency range; and determining a memory reclaim priority sequence of applications in each group according to a use frequency range corresponding to each group, where applications in a same group have a same priority sequence.

Optionally, in the instructions executed by the processor 61, if it is determined, according to the user operation and use information of the applications installed on the terminal, that the memory reclaim condition is currently met, the performing memory reclaim by invoking a memory reclaim interface provided by a kernel mode includes: if it is detected that duration of stay, by an application on the terminal, in the background exceeds specified duration, determining that the memory reclaim condition is currently met, and reclaiming, by invoking the memory reclaim interface provided by the kernel mode, memory of the application whose duration of stay in the background exceeds the specified duration.

Embodiment 6

Figure 7:
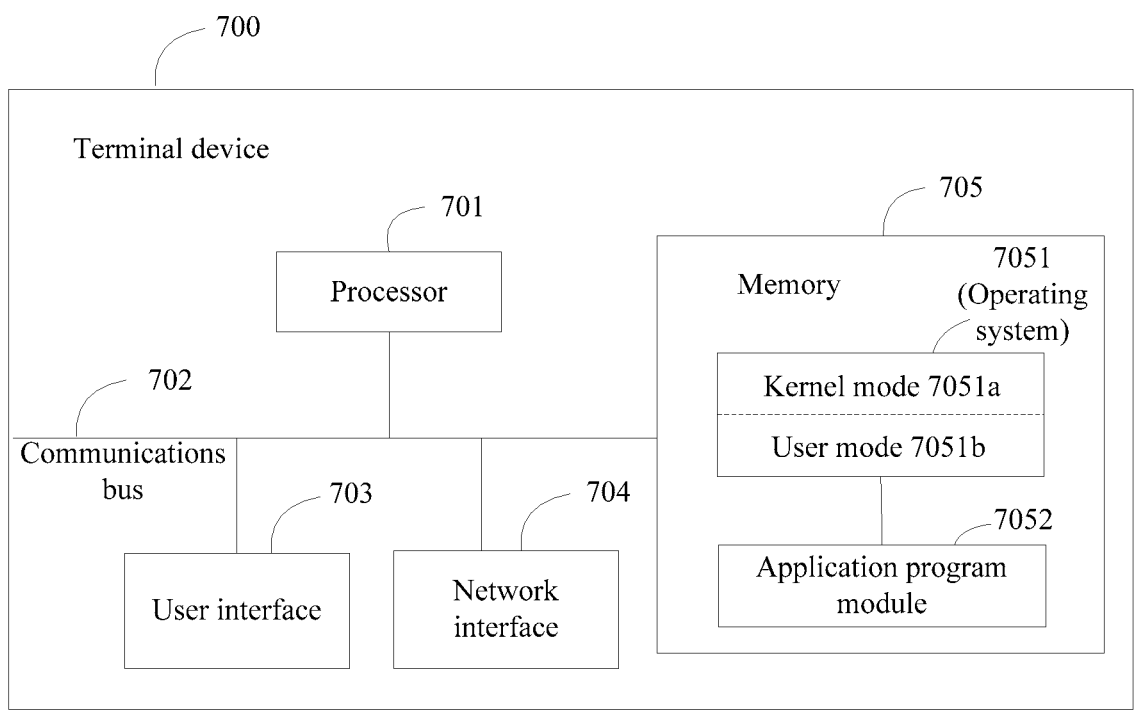
FIG. 7 is a schematic structural diagram of a terminal device 700 according to this application.

FIG. 7 describes a structure of a terminal device 700 according to this application, and the terminal device 700 includes: at least one processor 701, at least one network interface 704 or another user interface 703, a memory 705, and at least one communications bus 702. The communications bus 702 is configured to implement connection and communication between the components. Herein, the memory 705 includes an internal memory device and an external memory. The internal memory device herein is also referred to as an internal memory, and is configured to temporarily store operational data of the processor 701, and data exchanged with the external memory such as a hard disk. The processor 701 exchanges data with the external memory by using the internal memory device.

The memory 705 stores the following elements, executable modules or data results, or subsets thereof, or extended sets thereof.

An operating system 7051 includes various system programs, and may have two runlevels: a kernel mode 7051*a* and a user mode 7051*b*. When a process performs system invoking and enters kernel code for execution, the process is in kernel running mode, which is referred to as a kernel mode for short. When the process is in kernel mode, the kernel code in execution may use a kernel stack of the current process, and each process has its own kernel stack. When a process performs code of a user, the process is in user running mode, which is referred to as a user mode for short. In this case, the processor 701 runs in user code whose privilege level is the lowest.

An application program module 7052 includes various application programs (Application for short).

In this embodiment of this application, the processor 701 is configured to perform the following steps in user mode by invoking a program or an instruction stored in the memory 705:

monitoring user operation and use information and memory occupation information of applications installed on a terminal; and when it is determined, according to at least one of the user operation and use information or the memory occupation information of the applications installed on the terminal, that a memory reclaim condition is currently met, determining, according to user operation and use information and memory occupation information of applications currently running on the terminal and from the applications currently running on the terminal, an application whose memory is to be reclaimed, and performing memory reclaim by invoking a memory reclaim interface provided by the kernel mode.

Optionally, in an embodiment, the processor 701 is further configured to: determine a memory reclaim time interval according to the user operation and use information and the memory occupation information of the applications installed on the terminal; and determine that the memory reclaim condition is currently met when current time reaches memory reclaim time indicated by the memory reclaim time interval.

Further, the processor 701 is further configured to: separately determine user operation and use information and memory occupation information, in each time segment of at least one preset time segment, of the applications installed on the terminal; and for each time segment of the at least one preset time segment, separately determine a memory reclaim time interval within the time segment according to the user operation and use information and the memory occupation information, in the time segment, of the applications installed on the terminal.

Optionally, in another embodiment, the processor 701 is further configured to if it is determined that system free memory is less than a first specified threshold, determine that the memory reclaim condition is currently met.

Optionally, in still another embodiment, the processor 701 is further configured to: if it is detected that an application is started or switched to a foreground interface, determine, according to memory occupation information of the application and a size of system free memory, whether memory reclaim needs to be performed; and if memory reclaim needs to be performed, determine that the memory reclaim condition is currently met.

Optionally, in yet another embodiment, the processor 701 is further configured to if a quantity of applications currently running in a background is greater than a specified quantity of applications allowed to run in the background, determine that the memory reclaim condition is currently met.

Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

Further, that the processor 701 is further configured to determine the application whose memory is to be reclaimed, and perform memory reclaim by invoking the memory reclaim interface provided by a kernel mode includes: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met.

The memory reclaim termination condition includes one or more of the following conditions:

the size of the system free memory is larger than a second specified threshold;

memory required by a currently started application is less than the system free memory;

memory required by an application switched to the foreground interface is less than the system free memory; and a quantity of applications running in the background is less than or equal to the specified quantity of applications allowed to run in the background.

Further, the processor 701 is further configured to: group the applications installed on the terminal according to use frequency of the applications, where applications in a same group have a same use frequency range; and determine a memory reclaim priority sequence of applications in each group according to a use frequency range corresponding to each group, where applications in a same group have a same priority sequence.

Optionally, in still yet another embodiment, the processor 701 is further configured to: if it is detected that duration of stay, by an application on the terminal, in the background exceeds specified duration, reclaim memory of the application whose duration of stay in the background exceeds the specified duration.

In addition, the terminal device 700 may further perform the method and embodiments in FIG. 2 to FIG. 4, and details are not described herein again in this embodiment of this application.

It can be learned that after the foregoing solutions are used, when an application is frequently operated and used by a user and occupies relatively large memory, memory reclaim frequency may be increased, to ensure normal use of memory.

Embodiment 7

An embodiment of this application relates to a terminal 800 and a memory reclaim method, where the terminal 800 may be a mobile phone, a tablet, a personal digital assistant (Personal Digital Assistant, PDA), a Point of Sales (Point of Sales, POS), or an in-vehicle computer.

Figure 8:
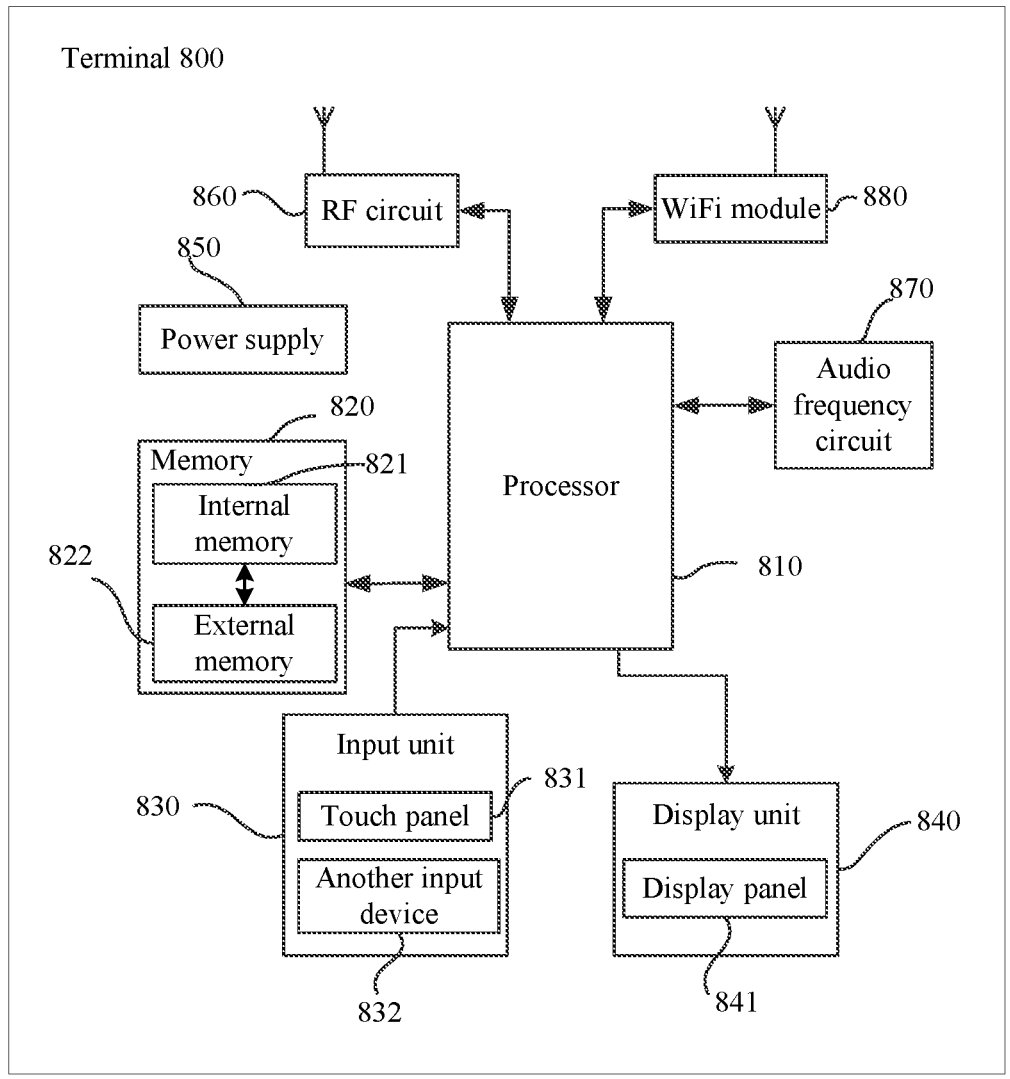
FIG. 8 is a schematic structural diagram of a terminal 800 according to an embodiment of this application.

FIG. 8 is a schematic structural diagram of a terminal 800 according to an embodiment of this application.

Referring to FIG. 8, the terminal 800 in this embodiment of this application includes: a processor 810, a memory 820, an input unit 830, a power supply 850, a radio frequency (Radio Frequency, RF) circuit 860, an audio frequency circuit 870, and a Wireless Fidelity (WiFi) module 880.

The memory 820 includes an internal memory device 821 and an external memory 822. The internal memory device 821 is configured to temporarily store operational data of the processor 810, and data exchanged with the external memory 822 such as a hard disk. The processor 810 exchanges data with the external memory 822 by using the internal memory device 821. The internal memory device 821 may be one of a non-volatile random access memory (Non-Volatile Random Access Memory, NVRAM), a dynamic random access memory (Dynamic Random Access Memory, DRAM), a static random access memory (Static RAM, SRAM), or a Flash memory; and the external memory 822 may be the hard disk, an optical disc, a USB flash drive, a floppy disk, or a tape drive.

The processor 810 performs an instruction in the memory 820 in user mode, so as to: monitor user operation and use information and memory occupation information of applications installed on a terminal; and when it is determined, according to at least one of the user operation and use information or the memory occupation information of the applications installed on the terminal, that a memory reclaim condition is currently met, determine, according to user operation and use information and memory occupation information of applications currently running on the terminal and from the applications currently running on the terminal, an application whose memory is to be reclaimed, and perform memory reclaim by invoking a memory reclaim interface provided by a kernel mode. The memory reclaim may be triggered by a specified memory reclaim time interval, and specifically, the processor 810 may separately determine user operation and use information and memory occupation information, in each time segment of at least one preset time segment, of the applications installed on the terminal; and for each time segment of the at least one preset time segment, separately determine a memory reclaim time interval within the time segment according to the user operation and use information and the memory occupation information, in the time segment, of the applications installed on the terminal. Optionally, memory reclaim may also be triggered when it is determined that system free memory is less than a first specified threshold. The memory reclaim may also be triggered if it is detected that an application is started or switched to a foreground interface and it is determined, according to memory occupation information of the application and a size of system free memory, that memory reclaim needs to be performed. The memory reclaim condition may also be triggered when a quantity of applications currently running in a background is greater than a specified quantity of applications allowed to run in the background. Further, herein, the quantity of applications allowed to run in the background may be set at a time interval according to a size of current free memory. Because applications running in the background are usually not applications currently used by the user, excessive unnecessary occupation of memory can be avoided by limiting a quantity of these applications.

Optionally, based on the foregoing trigger conditions, a process in which the processor 810 performs memory reclaim may be: selecting, according to a prestored priority sequence of applications whose memory is to be reclaimed, an application that is currently running on the terminal and that is not operated or used by a user, and determining whether current time is within a high-probability use time segment of the selected application, where the high-probability use time segment of the application is determined based on user operation and use information of the application; if the current time is not within the high-probability use time segment of the selected application, determining that the selected application is an application whose memory is to be reclaimed, and performing memory reclaim by invoking the memory reclaim interface provided by the kernel mode; and repeating the foregoing steps until a memory reclaim termination condition is met. Further, the memory reclaim termination condition may include one or more of the following conditions: the size of the system free memory is larger than a second specified threshold; memory required by a currently started application is less than the system free memory; memory required by an application switched to the foreground interface is less than the system free memory; and a quantity of applications running in the background is less than or equal to the specified quantity of applications allowed to run in the background. Further, applications installed on the terminal may be grouped according to use frequency of the applications, where applications in a same group have a same use frequency range. A memory reclaim priority sequence of applications in each group is determined according to a use frequency range corresponding to each group, where applications in a same group have a same priority sequence.

In addition, the processor 810 may further perform, when it is determined that the memory reclaim condition is currently met, memory reclaim by invoking the memory reclaim interface provided by the kernel mode.

An input unit 830 may be configured to receive input numeral or character information, and generate a signal input related to a user setting and functional control of the terminal 800. Specifically, in this embodiment of this application, the input unit 830 may include a touch panel 831. The touch panel 831, also referred to as a touchscreen, may collect a touch operation (such as an operation performed by a user on the touch panel 831 or near the touch panel 831 by using a finger, or any appropriate object or accessory such as a stylus) performed by the user on or near the touch panel, and drive a corresponding connection apparatus according to a preset program. Optionally, the touch panel 831 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch coordinates, and sends the touch coordinates to the processor 810, and may receive a command sent by the processor 810 and execute the command. In addition, the touch panel 831 may be implemented in a plurality of types, such as a resistor type, a capacitor type, an infrared type, and a surface acoustic wave type. In addition to the touch panel 831, the input unit 830 may further include one or more other input devices 832, where the one or more other input devices 832 may include but are not limited to one or more of the following: a physical keyboard, a function key (such as a volume control key and an on/off key), a trackball, a mouse, a joystick, or the like.

The terminal 800 may further include a display unit 840, where the display unit 840 may be configured to display information input by the user or information provided for the user, as well as various menu interfaces of the terminal 800. The display unit 840 may include a display panel 841. Optionally, a form of an LCD (Liquid Crystal Display, liquid crystal display) an OLED (Organic Light-Emitting Diode, organic light-emitting diode), or the like may be used to configure the display panel 841.

In this embodiment of this application, the touch panel 831 covers the display panel 841 to form a touch display screen. When detecting a touch operation on or near the touch display screen, the touch display screen transmits the touch operation to the processor 810 to determine a type of a touch event, and then the processor 810 provides a corresponding visual output on the touch display screen according to the type of the touch event.

In this embodiment of this application, the touch display screen includes an application interface display area and a common control display area. An arrangement manner of the application interface display area and the common control display area is not limited, and may be an arrangement manner that can differentiate the two display areas, such as an up-down arrangement manner or a left-right arrangement manner. The application interface display area may be used to display an application program interface. Each interface may include interface elements, such as an icon or home screen widget or both, of at least one application program. The application interface display area may also be an empty interface including none content. The common control display area is used to display a control of relatively high usage, for example, an application program icon such as a set button, an interface number, a scroll bar, a phone book icon, or the like.

The processor 810 is a control center of the terminal 800, and uses various interfaces and lines to connect all parts of an entire mobile phone. By running or executing a software program or a module or both that are stored in the internal memory device 821 and invoking data stored in the external memory 822, the processor 810 executes various functions of the terminal 800 and processes data, so as to perform overall monitoring on the terminal 800.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optional memory, and the like) that include computer usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to this application without departing from the spirit and scope of this application. In this case, this application is also intended to cover these modifications and variations of this application provided that they fall within the scope of protection defined by claims of this application and their equivalent technologies.

What is claimed is:

1. A memory reclaim method, wherein the following steps are performed in user mode:
   monitoring user operation and use information and memory occupation information of applications installed on a terminal; and
   in response to determining, according to at least one of the user operation and use information or the memory occupation information of the applications installed on the terminal, that a memory reclaim condition is currently met:

selecting, according to a prestored priority sequence of applications, an application that is currently running on the terminal and that is not operated or used by a user;

determining whether current time is within a high-probability use time segment of the selected application, wherein the high-probability use time segment of the application is determined based on user operation and use information of the application;

performing memory reclaim for the selected application when the current time is not within the high-probability use time segment of the selected application; and repeating the foregoing steps until a memory reclaim termination condition is met.

2. The method according to claim 1, wherein that determining, according to at least one of the user operation and use information or the memory occupation information of the applications installed on the terminal, that a memory reclaim condition is currently met comprises:

determining a memory reclaim time interval according to the user operation and use information and the memory occupation information of the applications installed on the terminal; and wherein the memory reclaim condition is currently met when determining that current time reaches memory reclaim time indicated by the memory reclaim time interval.

3. The method according to claim 2, wherein the determining a memory reclaim time interval according to the user operation and use information and the memory occupation information of the applications installed on the terminal comprises:

separately determining user operation and use information and memory occupation information, in each time segment of at least one preset time segment, of the applications installed on the terminal; and for each time segment of the at least one preset time segment, separately determining a memory reclaim time interval within the time segment according to the user operation and use information and the memory occupation information, in the time segment, of the applications installed on the terminal.

4. The method according to claim 1, wherein the memory reclaim condition is currently met when determining that system free memory is less than a first specified threshold.

5. The method according to claim 1, wherein that determining, according to at least one of the user operation and use information or the memory occupation information of the applications installed on the terminal, that a memory reclaim condition is currently met comprises:

determining, according to memory occupation information of the application and a size of system free memory, whether memory reclaim needs to be performed when an application is started or switched to a foreground interface; and wherein the memory reclaim condition is currently met when determining that memory reclaim needs to be performed.

6. The method according to claim 1, wherein the memory reclaim condition is currently met when determining that a quantity of applications currently running in a background is greater than a specified quantity of applications allowed to run in the background.

7. The method according to claim 1, wherein the memory reclaim termination condition comprises one or more of the following conditions:

a size of system free memory is larger than a second specified threshold;

memory required by a currently started application is less than the system free memory;

memory required by an application switched to a foreground interface is less than the system free memory; and a quantity of applications running in a background is less than or equal to a specified quantity of applications allowed to run in the background.

8. The method according to claim 1, wherein the priority sequence of applications is set according to the following steps:

grouping the applications installed on the terminal according to use frequency of the applications, wherein applications in a same group have a same use frequency range; and determining a memory reclaim priority sequence of applications in each group according to a use frequency range corresponding to each group, wherein applications in a same group have a same priority sequence.

9. A computer system, comprising:

a memory configured to store computer-readable instructions; and at least one processor configured to read the computer-readable instructions from the memory to cause the at least one processor to:

monitor user operation and use information and memory occupation information of applications installed on a terminal; and in response to determining, according to at least one of the user operation and use information or the memory occupation information of the applications installed on the terminal, that a memory reclaim condition is currently met:

select, according to a prestored priority sequence of applications, an application that is currently running on the terminal and that is not operated or used by a user;

determine whether current time is within a high-probability use time segment of the selected application, wherein the high-probability use time segment of the application is determined based on user operation and use information of the application;

perform memory reclaim for the selected application when the current time is not within the high-probability use time segment of the selected application; and repeat the foregoing steps until a memory reclaim termination condition is met.

10. The computer system according to claim 9, wherein the at least one processor is configured to:

determine a memory reclaim time interval according to the user operation and use information and the memory occupation information of the applications installed on the terminal; and wherein the memory reclaim condition is currently met when determining that current time reaches memory reclaim time indicated by the memory reclaim time interval.

11. The computer system according to claim 10, wherein the at least one processor is configured to:

separately determine user operation and use information and memory occupation information, in each time segment of at least one preset time segment, of the applications installed on the terminal; and for each time segment of the at least one preset time segment, separately determine a memory reclaim time interval within the time segment according to the user operation and use information and the memory occupation information, in the time segment, of the applications installed on the terminal.

12. The computer system according to claim 9, wherein the memory reclaim condition is currently met when determining that system free memory is less than a first specified threshold.

13. The computer system according to claim 9, wherein the at least one processor is configured to:
determine, according to memory occupation information of the application and a size of system free memory, whether memory reclaim needs to be performed when an application is started or switched to a foreground interface; and
wherein the memory reclaim condition is currently met when determining that memory reclaim needs to be performed.

14. The computer system according to claim 9, wherein the memory reclaim condition is currently met when determining that a quantity of applications currently running in a background is greater than a specified quantity of applications allowed to run in the background.

15. The computer system according to claim 9, wherein the memory reclaim termination condition comprises one or more of the following conditions:
a size of system free memory is larger than a second specified threshold;
memory required by a currently started application is less than the system free memory;
memory required by an application switched to a foreground interface is less than the system free memory; and
a quantity of applications running in a background is less than or equal to a specified quantity of applications allowed to run in the background.

16. The computer system according to claim 9, wherein the at least one processor is configured to:
group the applications installed on the terminal according to use frequency of the applications, wherein applications in a same group have a same use frequency range; and
determine a memory reclaim priority sequence of applications in each group according to a use frequency range corresponding to each group, wherein applications in a same group have a same priority sequence.

17. A computer program product, comprising instructions which, when performed by one or more processors, cause the one or more processors to:
monitor user operation and use information and memory occupation information of applications installed on a terminal; and
in response to determining, according to at least one of the user operation and use information or the memory occupation information of the applications installed on the terminal, that a memory reclaim condition is currently met:
selecting, according to a prestored priority sequence of applications, an application that is currently running on the terminal and that is not operated or used by a user;
determining whether current time is within a high-probability use time segment of the selected application, wherein the high-probability use time segment of the application is determined based on user operation and use information of the application;
performing memory reclaim for the selected application when the current time is not within the high-probability use time segment of the selected application; and
repeating the foregoing steps until a memory reclaim termination condition is met.

18. The computer program product according to claim 17, wherein the instructions which, when performed by one or more processors, further cause the one or more processors to:
determine a memory reclaim time interval according to the user operation and use information and the memory occupation information of the applications installed on the terminal; and
wherein the memory reclaim condition is currently met when determining that current time reaches memory reclaim time indicated by the memory reclaim time interval.

19. The computer program product according to claim 17, wherein the memory reclaim condition is currently met when determining that system free memory is less than a first specified threshold.

20. The computer program product according to claim 17, wherein the instructions which, when performed by one or more processors, further cause the one or more processors to:
determine, according to memory occupation information of the application and a size of system free memory, whether memory reclaim needs to be performed when an application is started or switched to a foreground interface; and
wherein the memory reclaim condition is currently met when determining that memory reclaim needs to be performed.

* * * * *